US010749250B2

(12) United States Patent
Ai et al.

(10) Patent No.: US 10,749,250 B2
(45) Date of Patent: Aug. 18, 2020

(54) MULTI-LAYER PHASE SHIFTER DRIVING DEVICE AND RELATED REMOTE ELECTRONIC TILT SYSTEMS AND ANTENNAS

(71) Applicant: CommScope Technologies LLC, Hickory, NC (US)

(72) Inventors: Bin Ai, Suzhou (CN); YiDing Wang, Suzhou (CN); PuLiang Tang, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/531,265

(22) Filed: Aug. 5, 2019

(65) Prior Publication Data

US 2020/0044321 A1 Feb. 6, 2020

(30) Foreign Application Priority Data

Aug. 6, 2018 (CN) .......................... 2018 1 0881718

(51) Int. Cl.
*H04B 1/06* (2006.01)
*H04B 7/00* (2006.01)
*H01Q 3/00* (2006.01)
*H01Q 1/24* (2006.01)
*H01Q 3/36* (2006.01)
*H01Q 23/00* (2006.01)

(52) U.S. Cl.
CPC ............... *H01Q 1/246* (2013.01); *H01Q 3/36* (2013.01); *H01Q 23/00* (2013.01)

(58) Field of Classification Search
CPC .......... H01Q 1/246; H01Q 3/005; H01Q 3/04; H01Q 3/12; H01Q 3/14; H01Q 3/26; H01Q 3/30; H01Q 3/32; H01Q 3/38; H01Q 3/267; H01Q 21/06; H01Q 21/24; H01Q 25/00; H04B 1/18; H04B 1/40; H04B 1/0254; H04B 7/0617; H04B 7/0695; H04W 16/28; H04M 1/0254
See application file for complete search history.

(56) References Cited

U.S. PATENT DOCUMENTS 6,801,160 B2 * 10/2004 Henderson ............. H01Q 1/246 342/372
7,170,446 B1 * 1/2007 West ........................ H01Q 3/30 333/164
7,880,677 B2 * 2/2011 Rofougaran ............. H01Q 1/24 343/700 MS
8,085,211 B2 * 12/2011 Yang ........................ H01Q 3/04 343/766

(Continued)

*Primary Examiner* — Quochien B Vuong
(74) *Attorney, Agent, or Firm* — Myers Bigel, P.A.

(57) ABSTRACT

A multi-layer phase shift driving device for an electrically regulated antenna includes multiple control boards that are spaced apart from each other, each of which is arranged with respective phase shift driving mechanisms for driving brushes of the electrically regulated antenna, and arranged with a plurality of holes through which rods pass, wherein each control board is provided with at least one of said rods fixed thereto to serve as fixing rods of the control board and serve as guiding rods of the other control boards of the multiple control boards, such that the multiple control boards can be driven independently of each other.

17 Claims, 6 Drawing Sheets

(56) References Cited

U.S. PATENT DOCUMENTS

| | | | | |
|---|---|---|---|---|
| 8,447,348 | B2 * | 5/2013 | Erceg | H04B 1/18 342/374 |
| 10,158,165 | B2 * | 12/2018 | Sledkov | H01Q 3/32 |
| 10,581,163 | B2 * | 3/2020 | Schmutzler | H01Q 3/06 |
| 2018/0287255 | A1 * | 10/2018 | Zimmerman | H01Q 3/06 |
| 2019/0369200 | A1 * | 12/2019 | Finger | G01S 3/78 |

* cited by examiner

MULTI-LAYER PHASE SHIFTER DRIVING DEVICE AND RELATED REMOTE ELECTRONIC TILT SYSTEMS AND ANTENNAS

CROSS-REFERENCE TO RELATED APPLICATION

The present application claims priority under 35 U.S.C. § 119 to Chinese Patent Application No. 201810881718.4, filed Aug. 6, 2018, the entire content of which is incorporated herein by reference.

FIELD OF THE INVENTION

The present invention generally relates to the field antennas having antenna beams with electrically adjustable tilt angles, which are often referred to as remote electronic tilt ("RET") antennas. More specifically, the present invention relates to multi-layer phase shifter driving devices for RET antennas and to related RET systems and RET antennas.

BACKGROUND

RET antennas are now widely used as based station antennas in cellular communications systems. Prior to the introduction of RET antennas, when the coverage area for a conventional base station antenna needed to be adjusted, it was necessary for a technician to climb the antenna tower on which the antenna was mounted and manually adjust the pointing angle of the antenna. Typically, the coverage area of the antenna is adjusted by changing the so-called "tilt" angle of the antenna, which is the angle in the elevation plane of the boresight pointing direction of the antenna beam generated by the antenna. The introduction of RET antennas allowed a cellular operator to electrically adjust the tilt angle of the antenna beam by sending a control signal to the antenna.

Base station antennas are typically implemented as phased array antennas that include an array of radiating elements. The arrays are often linear arrays where the radiating elements are stacked along a vertical axis that is perpendicular the plane defined by the horizon, although planar arrays and arrays having other shapes may also be used. A radio frequency (RF) signal that is to be transmitted by a phased array antenna may be divided into a plurality of sub-components, and each sub-component may be transmitted through a respective sub-set of the radiating elements that is typically referred to as a "sub-array." In some cases, each sub-array may include a single radiating element, while in other cases some or all of the sub-arrays may include two or more radiating elements that each transmit the same sub-component of the RF signal. The magnitudes of the sub-components of the RF signal may be the same or different, and the relative phases of the sub-components of the RF signal may be set so that the antenna beam formed by the array has a desired shape. In many cases, the relative phases of the sub-components of the RF signal are set by designing the sub-components of the RF signals to traverse respective paths through the antenna having different lengths, where the differences in path lengths provide desired phase shifts that electrically shape the antenna beam in a desired fashion.

A RET antenna further includes a RET system that allows a cellular operator to dynamically adjust the tilt angle of the antenna beam. In particular, the RET system allows the cellular operator to add additional phase shifts to the sub-components of the RF signals that are to be transmitted (and received) by the antenna, which changes the tilt angle of the antenna beam generated by the antenna. The RET system typically comprises a drive motor, a transmission mechanism, and a phase shifter for each array of radiating elements. When cross-polarized radiating elements are used, the RET system may include a single drive motor and transmission mechanism per array, but two phase shifters are provided to adjust the phases of the sub-components of the RF signals having the two respective polarizations. Each phase shifter may include a fixed element, a moveable element and a phase shifter driving device. The phase shifter driving device may convert a motion generated by the drive motor and transmitted via the transmission mechanism into a movement of the moveable element of the phase shifter relative to the fixed element so as to change a phase of a signal, thereby realizing the adjustment of the electric tilt angle.

A number of different types of phase shifters are known in the art, including, for example, rotary wiper arm phase shifters, trombone style phase shifters and sliding dielectric phase shifters. In a rotary wiper arm phase shifter, a wiper printed circuit board is mounted above a main printed circuit board by a pivot pin so that the wiper printed circuit board may rotate above the main printed circuit board. Typically the phase shifter will include one or more power dividers that split an RF signal that is input to the phase shifter into a plurality of sub-components. At least a portion of the RF signal is transferred to the wiper printed circuit board and then coupled from the wiper printed circuit board to a transmission path on the main printed circuit board. The path length through the phase shifter of each sub-component of the RF signal that is transferred to the wiper printed circuit board depends upon the position of the wiper printed circuit board above the main printed circuit board. Thus, by moving the wiper printed circuit board (e.g., using an actuator) the phases of the sub-components of the RF signal may be adjusted in order to change the tilt angle of the antenna beam. Trombone style phase shifters operate in a similar manner, except that the moveable element of the phase shifter moves linearly instead of along an arc. Sliding dielectric phase shifters have a fixed path length, but move dielectric material that is part of the RF transmission lines through the phase shifter in order to change the dielectric constant of transmission line substrate, which acts to change the phase shift.

Many modern base station antennas include multiple arrays of radiating elements. The tilt angle for the antenna beam generated by each array is typically independently adjusted. Accordingly, in order to realize different electric tilt angles for the different arrays, it is usually necessary to adjust the respective phase shifters in different directions and by different amounts. As noted above, each array will typically have an associated drive motor, transmission mechanism and phase shifter, which can take up a significant amount of room within the interior of the antenna cavity. In addition, the space of the antenna cavity may be narrow and the routing may be complicated, which makes the available space extremely limited.

SUMMARY

According to a first aspect of the present invention, there is provided a multi-layer phase shifter driving device for a RET antenna, where the multi-layer phase shifter driving device includes multiple control boards that are spaced apart from each other. Each control board may have one or more phase shifter driving mechanisms mounted thereon for driving moveable elements of the respective phase shifters. The control boards may also include a plurality of holes through which rods pass. One or more of the rods may be fixed to each control board to serve as a fixing rod of the control board and to serve as a guiding rod for the other control boards, such that the multiple control boards can be driven independently of each other.

It should be noted that the "hole" mentioned in the present invention may be a completely enclosed openings or partially enclosed openings such as, for example, recesses on the control board.

In some embodiments, the multi-layer phase shifter driving device may be a two-layer phase shifter driving device that includes two control boards, that is, an upper control board and a lower control board, and each control board is provided with at least one rod fixed thereto to serve as a fixing rod of one control board and that serves as a guiding rod of the other control board. In other embodiments, the multi-layer phase shifter driving device may be a three-layer phase shifter driving device that includes an upper control board, a middle control board, and a lower control board.

References herein to multiple control boards being "driven independently of each other" means that each control board can move not only in different directions but also with different displacement amounts, without interfering with the other control boards. Therefore, the respective phase shifter driving mechanisms that are mounted on one control board can move in one direction and with one displacement amount, thereby driving the corresponding moveable elements of a first set of phase shifters, while the respective phase shifter driving mechanisms that are mounted on another control board can move in another direction and with another displacement amount, thereby driving the corresponding moveable elements of a second set of phase shifters. A desired adjustment of the tilt angle for each antenna beam may therefore be achieved. Furthermore, a compact and effective arrangement can be realized.

The phase shifter driving mechanisms that are mounted on one control board may be rotationally offset from the phase shifter driving mechanisms on the other control boards.

As used herein, references to phase shifter driving mechanisms on a control board that are "rotationally offset" from each other means that the phase shifter driving mechanisms are mounted on sides or edges of the control board that are spaced apart from one another (i.e. not adjacent to one another). Thus, when viewed from above, two rotationally offset phase shifter driving mechanisms will not overlap. The control boards may be vertically stacked within the antenna, and the phase shifter driving mechanisms on all of the control boards may be rotationally offset from one another so that the phase shifter driving mechanisms do not overlap when viewed from above.

In some embodiments, a protrusion may be provided at an edge of at least one of the holes on each control board, and rods may be attached to the respective protrusions to fixedly attach the rods to the respective control boards.

Each fixing rod and its corresponding protrusion may be fixedly connected to each other using, for example, a threaded connection, such as screw or a bolt and a nut, or by other fastening means such as snap-fit connection and the like. If the fixing rods are omitted, when the transmission mechanism moves to thereby generate a corresponding movement of one of the control boards, the phase shifter driving mechanisms that are mounted on the control board may be driven asynchronously (for example, the phase shifter driving mechanisms on a side of the control board that adjacent a pull rod of the transmission mechanism may be driven first, while the phase shifter driving mechanisms on the other side of the control board (i.e., the side that is spaced apart from the pull rod) may only move after a short delay), and this asynchronous movement may prevent a desired adjustment effect from being achieved. The arrangement of the fixing rods may reduce or eliminate this potential problem, so that the control boards together with the respective phase shifter driving mechanisms that are mounted thereon can be moved synchronously.

In some embodiments, each control board may include at least two fixing rods. As the number of fixing rod is increased, so may the reliability that the control boards can be synchronously driven.

In some embodiments, each control board may include a plurality of connecting portions, and a phase shifter driving mechanism may be mounted on each respective connecting portion.

In some embodiments, the connecting portions may be circumferentially arranged about the perimeter of each control board, and may be spaced apart from each other and fixedly connected to respective ones of the phase shifter driving mechanisms.

Each connecting portion may implemented as a side of the control board, or may be a projection that is integrally molded with a side of the control board. The protrusions on the respective control boards may extend toward each other. Thus, for example, a two-layer phase shifter driving device may include projections on the upper control board that extend toward the lower control board and protrusions on the lower control board that extend toward the upper control board. The connecting portions and the phase shifter driving mechanisms may be fixedly connected using threaded connections such as screws or bolt and nut connections, or may be connected using other fastening means such as snap-fit connections and the like.

In some embodiments, the connecting portions may be circumferentially spaced apart from each other.

In some embodiments, at least one connecting portion on a first control board is arranged within an interval between two adjacent connecting portions on a second control board, so that the multiple control boards form a compact structure.

The compact construction may be advantageous because the space available within the interior of the antenna may be limited. This problem is particularly noticeable when multiple groups of phase shifter driving mechanisms are driven by multiple control boards. The connecting portions on the respective control boards can make full use of the space.

The multiple control boards may be configured so that they do not interfere with each other within the respective movement strokes.

Each control board may be configured so that it may be moved independently of the other control boards. For example, in the case of a two-layer phase shifter driving device, the longitudinal movement stroke of the two-layer phase shifter driving device may be for example between −50 mm and +50 mm. Of course, the length of the movement stroke may be adjusted according to different application scenarios. Here, it is necessary to ensure that: when the upper phase shift driving device moves downwards by −50 mm and at the same time the lower phase shift driving device moves upwards by +50 mm, there is no contact or collision between the upper control board and the lower control board. In other words, there is no overlap or interference of the strokes between the two layers, so as to ensure that the control boards may be moved independently of each other.

In some embodiments, the phase shifter driving mechanisms on the multiple control boards may be in the same plane or substantially in the same plane. In some embodiments, the phase shifter driving mechanisms on the multiple control boards may be vertically offset from each other. As long as the phase shift driving mechanisms do not extend beyond the entire inner space, the multiple phase shift driving mechanisms can be scattered in different planes.

As mentioned above, due to a limited internal space within the antenna, it is generally not allowed to respectively arrange the respective groups of phase shifter driving mechanisms in layers that are spaced apart from each other by large distances. Typically, the moveable elements of the phase shifters and their associated phase shifter driving mechanisms are all almost on the same plane, which saves space, but may complicate the structural arrangement. Accordingly, how to individually drive and control multiple groups of phase shifter driving mechanisms that are substantially within the same plane and within a narrow space, and ensure that there is no interference between each other, may be important.

In some embodiments, at least one opening may be provided through each control board that may be used for routing cables and/or other structural components.

As mentioned above, the routing inside the antenna may also be very complicated. Accordingly, in addition to arranging the phase shifter driving devices, sufficient space may also be necessary for cable routing and other structural components, for example structural reinforcement members. The arrangement of the opening effectively realizes such purpose.

In some embodiments, each control board may be a sheet metal member, or may be a plastic member formed by injection molding.

The use of plastic boards may be especially well-suited for mass production, as they may increase production efficiency and reduce production costs. The structural reinforcement members may also be formed of plastic.

In some embodiments, each control board may have a polygonal shape so that the multi-layer phase shifter driving device is configured to have a compact polyhedral structure.

In some embodiments, the polygonal shape may a hexahedron shape or an octahedron.

In some embodiments, the rods are respectively disposed to be guidably accommodated within a guide rail mechanism fixed on a reflection plate of the antenna. In this way, movement of the respective control boards in a defined manner is realized simply and economically, and the movement of the control boards is more precise and reliable. In addition, the cooperation effect of the guide rail mechanism and the rod enables a simple, fast and efficient assembly of the multi-layer phase shifter driving device.

In some embodiments, each phase shifter driving mechanism may include at least one grooved section, and mounting terminals for the moveable elements of the respective phase shifters may be slidably mounted within each grooved section. When the respective phase shifter driving mechanisms are driven, for example, longitudinally, the mounting terminals may move laterally within the corresponding grooved sections, so that the moveable elements of the phase shifters may move with respect to the fixed elements of the respective phase shifters so as to adjust the phase in order to effect a change in the tilt angle of the antenna beam.

According to a second aspect of the present invention, there is provided a RET system that includes the multi-layer phase shifter driving device according to the present invention and a plurality of drive motors, wherein each drive motor correspondingly drives one control board of the multiple control boards.

For example, a three-layer phase shifter driving device according to embodiments of the present invention may be part of a RET system that includes three drive motors, each of which drives a corresponding phase shifter driving device to move upwards or downwards according to the corresponding control instructions. Each phase shifter driving device may be independently driven to move in different directions and with different displacement amounts, so as to achieve the desired phase adjustment.

According to a third aspect of the present invention, there is provided a RET antenna that includes a multi-layer phase shifter driving device and a plurality of reflection plates, wherein the multi-layer phase shifter driving device is arranged within a cavity formed by the reflection plates.

DETAILED DESCRIPTION

Figure 1:
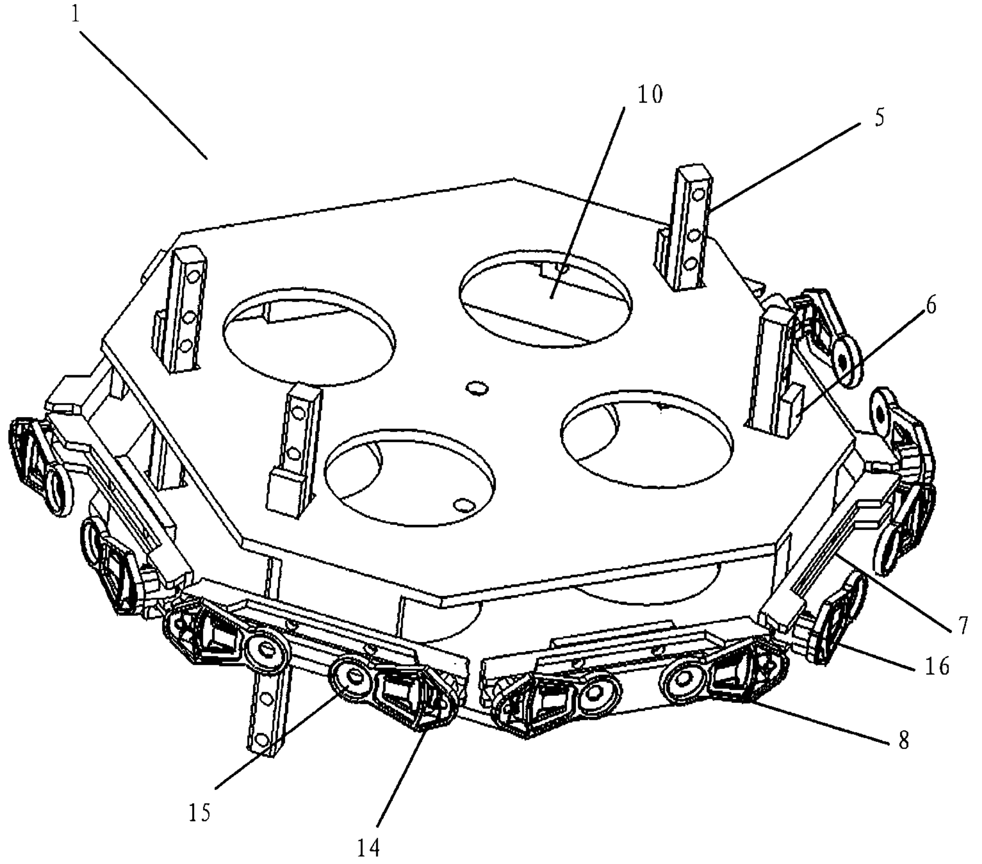
FIG. 1 is an exemplary perspective view of a two-layer phase shifter driving device.

The present invention will be described below with reference to the drawings, in which several embodiments of the present invention are shown. It should be understood, however, that the present invention may be implemented in many different ways, and is not limited to the example embodiments described below. The embodiments described hereinafter are intended to make a more complete disclosure of the present invention and to adequately explain the protection scope of the present invention to a person skilled in the art. It should also be understood that, the embodiments disclosed herein can be combined in various ways to provide many additional embodiments.

It should be understood that, the wording in the specification is only used for describing particular embodiments and is not intended to limit the present invention. All the terms used in the specification (including technical and scientific terms) have the meanings as normally understood by a person skilled in the art, unless otherwise defined. For the sake of conciseness and/or clarity, well-known functions or constructions may not be described in detail.

The singular forms “a/an”, “said” and “the” as used in the specification, unless clearly indicated, all contain the plural forms. The words “comprising”, “containing” and “including” used in the specification indicate the presence of the claimed features, but do not preclude the presence of one or more additional features. The wording “and/or” as used in the specification includes any and all combinations of one or more of the relevant items listed.

In the specification, words describing spatial relationships such as "up", "down", "left", "right", "forth", "back", "high", "low" and the like may describe a relation of one feature to another feature in the drawings. It should be understood that these terms also encompass different orientations of the apparatus in use or operation, in addition to encompassing the orientations shown in the drawings. For example, when the apparatus in the drawings is turned over, the features previously described as being "below" other features may be described to be "above" other features at this time. The apparatus may also be otherwise oriented (rotated 90 degrees or at other orientations) and the relative spatial relationships will be correspondingly altered.

It should be understood that, in all the drawings, the same reference signs present the same elements. In the drawings, for the sake of clarity, the sizes of certain features may not always be drawn to scale.

The multi-layer phase shifter driving devices according to embodiments of the present invention are suitable for use in RET antennas. The RET antennas may include a RET system for each array thereof. Each RET system may include a drive motor, a transmission mechanism, a phase shifter driving mechanism, and a phase shifter. The drive motor drives the phase shifter driving device by means of the transmission mechanism, so that the phase shifter driving device drives the moveable element of the phase shifter so as to adjust the phases of the sub-components of the RF signal that are supplied to the radiating elements of the antenna. As described above, by changing the phases of the sub-components of the RF signal, the magnitudes of the vertical component and the horizontal component are changed to change the resultant field intensity, thereby changing the downward tilt angle of the antenna beam generated by the antenna.

Referring now to FIGS. 1 to 4, a multi-layer phase shifter driving device 1 according to one embodiment of the present invention is shown. The multi-layer phase shifter driving device 1 is a two-layer phase shifter driving device. The two-layer phase shifter driving device 1 comprises an upper control board 2 and a lower control board 3. The two control boards 2, 3 may be substantially conformingly constructed.

The upper control board 2 includes four holes 4. Likewise, the lower control board 3 includes four holes 4. The holes 4 in the upper control board 2 and the four holes 4 in the lower control board 3 are longitudinally aligned in pairs, and four rods 5 sequentially pass through the four holes 4 of the upper control board 2 and the four holes 4 of the lower control board 3, respectively. Two of the four rods 5 (for example, two that are arranged along a diagonal) are fixedly connected to the upper control board 2 as fixing rods, and serve as guiding rods for guiding the lower control board 3. The other two rods 5 are fixedly connected to the lower control board 3 as fixing rods, and serve as guiding rods for guiding the upper control board 2. In other embodiments, the upper control board 2 and the lower control board 3 may be constructed with less than four or more than four holes 4, and the rods 5 corresponding to the holes 4 may sequentially pass through the holes 4 in the upper control board 2 and the lower control board 3, respectively. Some of these rods 5 are fixedly connected to the upper control board 2, and pass through the holes in the lower control board 3 in such a manner as to guide the lower control board 3. Moreover, other of the rods 5 are fixedly connected to the lower control board 3, and pass through the holes 4 in the upper control board 2 in such a manner as to guide the upper control board 2.

The fixed connection between the fixing rods 5 and the corresponding control boards 2, 3 may be realized in various ways. In one embodiment, a protrusion 6 is integrally molded with the control board and provided at the edge of the hole 4, and the fixing rod 5 is fixed to the protrusion 6 by means of a screw or the like. In this way, a first pair of fixing rods 5 may be firmly attached to one control board, and another pair of fixing rods 5 may be firmly attached to the other control board.

Generally, it is difficult to accurately locate the transmission rod of the transmission mechanism right in the center of a control board 2, 3. Therefore, when a control board 2, 3 is pulled by the transmission mechanism, the phase shifter driving mechanisms on the side of the control board 2, 3 that is adjacent the transmission rod may be moved first, and the phase shifter driving mechanisms on the side of the control board 2, 3 that is spaced apart from the pull rod is subjected to delayed movement, so that a plurality of phase shifter driving mechanisms on the same control board cannot obtain a synchronous adjustment effect. Accordingly, the fixing rod favorably solves such problem, so that the control boards (and the phase shifter driving mechanisms mounted thereon) may all move synchronously.

Figure 2:
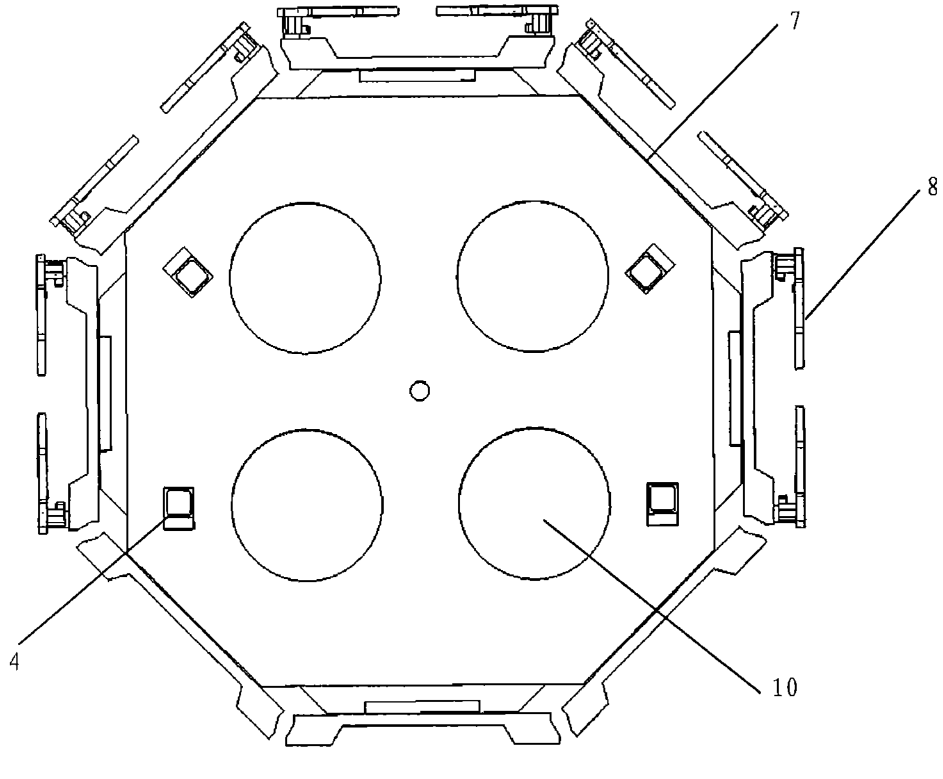
FIG. 2 is an exemplary top view of the two-layer phase shifter driving device of FIG. 1.

As shown in FIGS. 1 and 2, the upper control board 2 and the lower control board 3 may be configured to be octagonal panels in an example embodiment. Four projections 9 are respectively arranged on the four mutually spaced sides of the upper control board 2, and a respective phase shifter driving mechanism 7 is mounted on each of the projections 9. In addition, four projections 9 are respectively arranged on the four mutually spaced sides of the lower control board 3, and each projection has a respective phase shifter driving mechanism 7 mounted thereon. In other embodiments, the upper control board 2 and the lower control board 3 may be configured to be panels having polygonal shapes different from octagons, such as quadrilateral shapes, hexagonal shapes, decagon shapes, and the like.

The sides of the upper control board 2 and the lower control board 3 that have the phase shifter driving mechanisms 7 mounted thereon are rotationally offset from each other such that, the phase shifter driving mechanisms 7 of the upper control board 2 and the phase shifter driving mechanisms 7 of the lower control board 3 are almost on the same horizontal plane. Each control board 2, 3 may be configured to adjust the tilt for one or more arrays of radiating elements, where the tilt for each array associated with a particular control board is adjusted the same amount. It will be appreciated that the phase shifter driving mechanisms 7 may be arranged in any appropriate manner. For example, in the case of an octagonal control board, the upper control board 2 may include three phase shifter driving mechanisms 7 that are respectively arranged on three adjacent sides and a fourth phase shifter driving mechanism 7 that is mounted on a side that is not adjacent to the three sides. In such an embodiment, the lower control board 3 may have four phase shifter driving mechanisms 7 mounted thereon on the four sides corresponding to the sides of the upper control board 2 which do not have phase shifter driving mechanisms 7 mounted thereon. Of course, the number of phase shifter driving mechanisms 7 on each control board does not have to be the same. For example, in another embodiment, three phase shifter driving mechanisms 7 may be mounted on the upper control board 2, and five phase shifter driving mechanisms 7 may be mounted on the lower control board 3, or vice versa.

Figure 3:
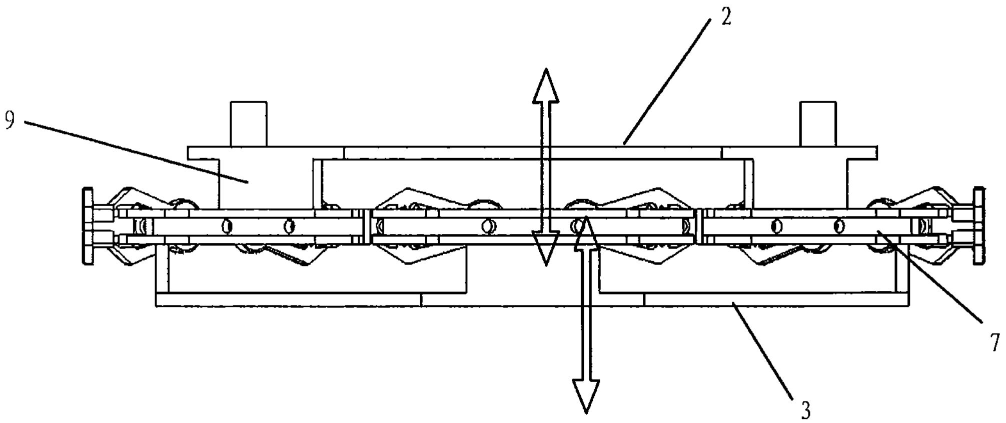
FIG. 3 is an exemplary side view of the two-layer phase shifter driving device of FIG. 1.

Certain spacing is maintained between the projections 9 of the upper control board 2 and the projections 9 of the lower control board 3. The spacing may be greater than or equal to the maximum movement stroke of the control boards, thereby ensuring that the two control boards 2, 3 do not interfere with each other in the respective movement strokes. That is, as shown in FIG. 3, when the upper control board 2 moves downward while the lower control board 3 moves upward, the two control boards 2, 3 may be configured so that they do not interfere with each other and/or do not contact each other.

Figure 4:
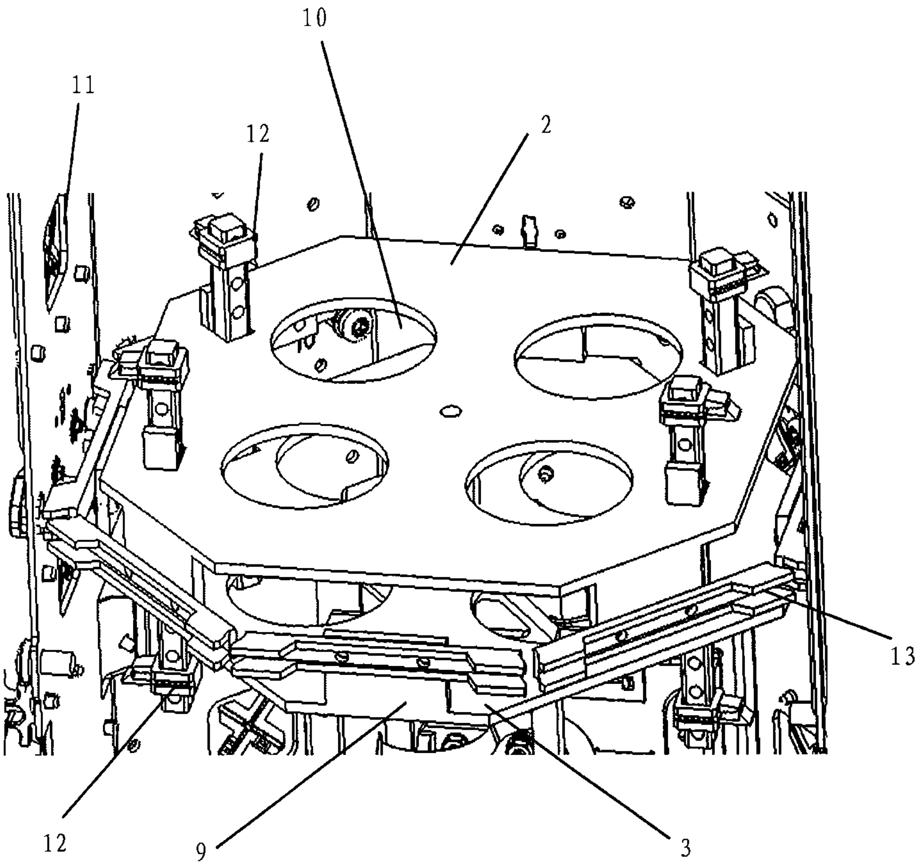
FIG. 4 is a partial view of the two-layer phase shifter driving device of FIG. 1 mounted within an antenna.

As shown in FIGS. 1, 2 and 4, one or more openings 10 are provided in the upper control board 2 and the lower control board 3 for cable routing and/or for accommodating other structural components. As described above, by providing the openings 10 in the upper and lower control boards 2, 3, the complicated cable routing and the arrangement of other structural components (such as structural reinforcement members) may be realized within a narrow internal space of the antenna, and the material cost of the control boards 2, 3 can be reduced.

FIG. 4 is a partial view of the two-layer phase shifter driving device 1 mounted within an antenna. It may be seen from the drawings that, the two-layer phase shifter driving device 1 is accommodated within a cavity defined by the reflection plates 11 of the antenna. The depicted antenna includes a total of eight reflection plates 11, but only four of the reflection plates 11 are shown so that the phase shifter driving device 1 can be seen in the drawing. Four groups of guide rail mechanisms are provided within the interior of the antenna, each of which comprises two longitudinal guide rails 12, for accommodating the rods 5 of the phase shifter driving device 1. The guide rail mechanisms may be mounted, for example to inner walls of the reflection plates 11. The distance between the two longitudinal guide rails 12 may be set such that the rods 5 can move longitudinally within the two longitudinal guide rails 12, but cannot be detached from the two longitudinal guide rails 12, thereby mounting the two-layer phase shifter driving device 1 within the interior of the antenna. The guide rail mechanism simplifies the connection of the two-layer phase shifter driving mechanism 1 within the cavity of the antenna, and enables the two-layer phase shifter driving mechanism to accurately move longitudinally in a defined direction.

FIGS. 1 and 4 show an exemplary configuration of the phase shifter driving mechanism 7 and the manner in which it connects to a moveable element 8 of a phase shifter. The moveable element 8 of the phase shifter may comprise, for example, a wiper support that has a base 15 and a distal end 14. A pivot pin (not shown) may be inserted through the base 15 so that the moveable element 8 may rotate about the pivot pin. A wiper printed circuit board (not shown) may be mounted on the wiper support. Each phase shifter driving mechanism 7 may include a pair of projecting grooved sections 13 on either side thereof. Mounting terminals 16 may be mounted within the respective grooved sections 13 and attached to the distal ends 14 of the moveable elements 8 of each phase shifters. Each mounting terminal 16 may be mounted so that it can move freely along its respective grooved section 13. Each phase shifter driving mechanism 7 includes an intermediate section between the two projecting grooved sections 13. Two threaded holes are exemplarily constructed in the intermediate section of each phase shifter driving mechanism 7 for threaded connection with the projections 9 on the control boards 2, 3. As discussed above, the base 15 of the moveable element 8 of each phase shifter includes a hole, by means of which (for example in a threaded connection manner) the moveable element 8 of the phase shifter can be attached to a fixed element of the phase shifter (not shown) such as, for example, a main printed circuit board of the phase shifter. The distal end 14 of each moveable element 8 is movably captured in a respective one of the grooved sections 13 by means of the mounting terminal 16. Accordingly, when the corresponding phase shifter driving mechanism 7 is driven longitudinally by the drive motor, the distal end 14 of each moveable element 8 follows the longitudinal movement of the corresponding phase shifter driving mechanism 7, and at the same time, each mounting terminal 16 moves laterally within its corresponding grooved section 13. The movable element 8 of each phase shifter can move over the fixed element of the respective phase shifter according to a specified trajectory, for example a circular arc shaped trajectory, so as to adjust the phase of a sub-component of an RF signal.

Figure 5:
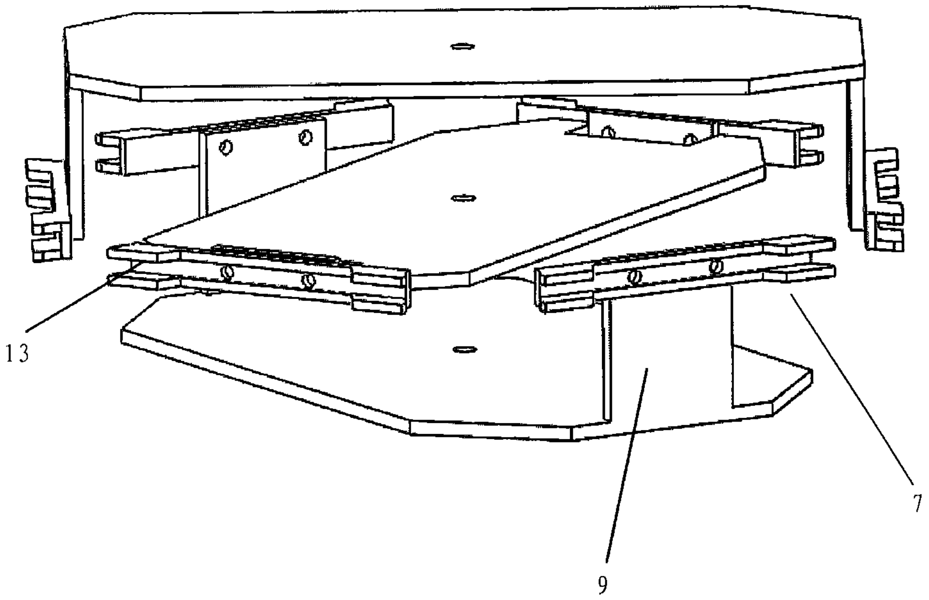
FIG. 5 is an exemplary perspective view of a three-layer phase shifter driving device.
Figure 6:
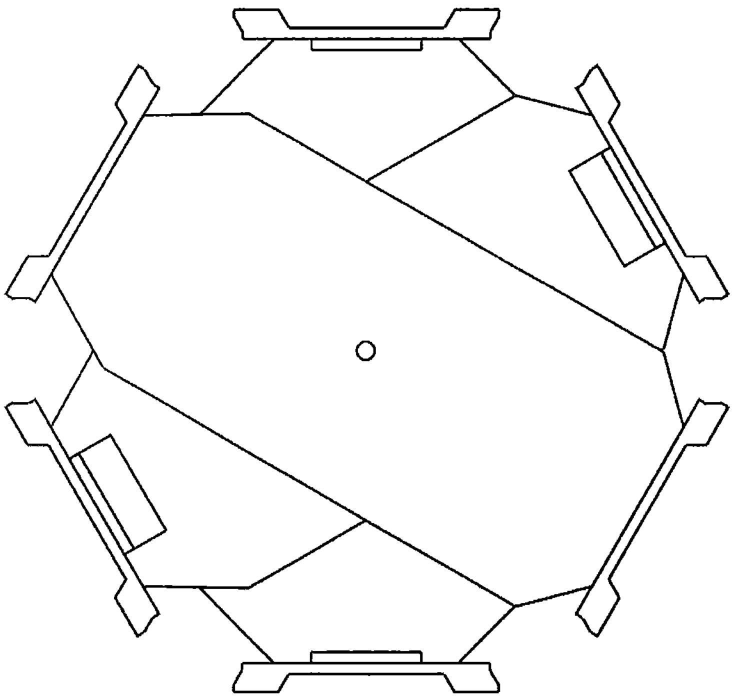
FIG. 6 is an exemplary top view of the three-layer phase shifter driving device of FIG. 5.

A multi-layer phase shifter driving device 1 according to another embodiment of the present invention is shown in FIGS. 5 and 6. As shown in the drawings, the multi-layer phase shifter driving device of FIGS. 5-6 is a three-layer phase shifter driving device. FIG. 5 is a perspective view of the three-layer phase shifter driving device, and FIG. 6 is a top view of a three-layer phase shifter driving device.

As can be seen from the drawings, the three-layer phase shifter driving device comprises an upper control board, a middle control board, and a lower control board. The upper control board includes projections 9 on its two opposed sides. The projections 9 extend substantially perpendicularly towards the lower control board, and each projection 9 has a phase shifter driving mechanism 7 mounted thereon. The two phase shifter driving mechanisms 7 on the upper control board are rotationally offset from each other by approximately 180 degrees. The lower control board likewise includes projections 9 on its two opposed sides. The projections 9 extend substantially perpendicularly towards the upper control board, and each projection 9 has a phase shift driving mechanism 7 mounted thereon. The two phase shifter driving mechanisms 7 on the lower control board are rotationally offset from each other by approximately 180 degrees. The middle control board has a phase shifter driving mechanism 7 mounted on two of its two opposed sides, so that the two phase shifter driving mechanisms 7 on the middle control board are also rotationally offset from each other by approximately 180 degrees. The three control boards are rotationally offset from each other by approximately 60 degrees. Based on such arrangement structure, the phase shifter driving mechanisms 7 that are mounted on each control board may be in substantially the same plane and arranged to be rotationally offset from the phase shifter driving mechanisms 7 on the other control boards, thereby achieving a spatially compact structure.

It should be noted that, the specific structure on each control board is not shown in FIGS. 5 and 6. Accordingly, reference may be made to the elaboration regarding the two-layer phase shifter driving device discussed above with reference to FIGS. 1-4.

While not shown in the drawings, the upper control board of the three-layer phase shifter driving device of FIGS. 5 and 6 may include six holes 4. Similarly, the middle control board and the lower control board may also each include six holes 4. The six holes 4 of the upper control board, the six holes 4 of the middle control board and the six holes 4 of the lower control board may be longitudinally aligned in pairs, and six rods may sequentially pass through the six holes of the upper control board, the six holes of the middle control board and the six holes of the lower control board, respectively. First and second of the six rods may be fixedly connected to the upper control board as fixing rods, and serve as guiding rods for guiding the middle control board and the lower control board. Third and fourth of the six rods may be fixedly connected to the middle control board as fixing rods, and serve as guiding rods for guiding the upper control board and the lower control board. Fifth and sixth of the six rods may be fixedly connected to the lower control board as fixing rods, and serve as guiding rods for guiding the upper control board and the middle control board. In other embodiments, the upper control board, the middle control board and the lower control board may be constructed with less than six or more than six holes 4, and the rods corresponding to the holes in quantity sequentially pass through the holes 4 in the upper control board the middle control board and the lower control board, respectively. Thereby, the three control boards can be driven by the respective drive motors independently of each other and without interference with each other. Compared to the two-layer phase shifter driving device, the three-layer phase shifter driving device can also achieve more abundant and more flexible adjustment possibilities.

Although the exemplary embodiments of the present invention have been described, a person skilled in the art should understand that, multiple changes and modifications may be made to the exemplary embodiments without substantively departing from the spirit and scope of the present invention. Accordingly, all the changes and modifications are encompassed within the protection scope of the present invention as defined by the claims. The present invention is defined by the appended claims, and the equivalents of these claims are also contained therein.

What is claimed is:

1. A multi-layer phase shifter driving device for an antenna, characterized in that the multi-layer phase shifter driving device comprises multiple control boards that are spaced apart from each other, each of which has respective phase shifter driving mechanisms mounted thereon for driving moveable elements of respective phase shifters and arranged with a plurality of holes through which rods pass, wherein each control board is provided with at least one of said rods fixed thereto to serve as fixing rods of the control board, such that the multiple control boards can be driven independently of each other.

2. The multi-layer phase shifter driving device according to claim 1, wherein the phase shifter driving mechanisms on all of the control boards are rotationally offset from one another.

3. The multi-layer phase shifter driving device according to claim 1, wherein a respective protrusion is provided at an edge of at least one of the holes for fixing the fixing rods to the control boards.

4. The multi-layer phase shifter driving device according to claim 1, wherein each control board is provided with at least two fixing rods.

5. The multi-layer phase shifter driving device according to claim 1, wherein at least one of the control boards includes a plurality of connecting portions corresponding to the phase shifter driving mechanisms, and the phase shifter driving mechanisms are mounted on the respective connecting portions.

6. The multi-layer phase shifter driving device according to claim 5, wherein the plurality of connecting portions are spaced apart from each other in a circumferential direction of the control boards.

7. The multi-layer phase shifter driving device according to claim 6, wherein the connecting portions of the control boards are rotationally offset from each other.

8. The multi-layer phase shifter driving device according to claim 5, wherein at least one connecting portion on one control board is arranged within an interval between two adjacent connecting portions on another control board.

9. The multi-layer phase shifter driving device according to claim 1, wherein the phase shift driving mechanisms on the multiple control boards are substantially in the same plane.

10. The multi-layer phase shifter driving device according to claim 1, wherein at least one opening is provided through each control board for cable routing and/or other structural components.

11. The multi-layer phase shifter driving device according to claim 1, wherein each control board is formed of sheet metal member or plastic.

12. The multi-layer phase shifter driving device according to claim 1, wherein each control boards comprises a polygonal panel.

13. The multi-layer phase shifter driving device according to claim 1, wherein the rods are respectively disposed to be guidably accommodated within a guide rail mechanism that is attached to a reflection plate of the antenna.

14. The multi-layer phase shifter driving device according to claim 1, wherein each phase shifter driving mechanism includes at least one grooved section, within which mounting terminals for the moveable elements of respective phase shifters are mounted such that the mounting terminals are movable within the respective grooved sections.

15. The multi-layer phase shifter driving device according to claim 1 wherein at least one of the rods serve as guiding rods for control boards that the rods are not fixed to.

16. A remote electrical tilt (RET) assembly comprising the multi-layer phase shifter driving device according to any one of claim 1 and a plurality of drive motors, wherein each control board is driven by one of the plurality of drive motors.

17. A remote electrical tilt (RET) antenna comprising the multi-layer phase shifter driving device according to claim 1 and a plurality of reflection plates, wherein the multi-layer phase shifter driving device is arranged within a cavity formed by the plurality of reflection plates.

* * * * *